United States Patent
Yu et al.

(10) Patent No.: US 6,435,814 B1
(45) Date of Patent: Aug. 20, 2002

(54) FILM COOLING AIR POCKET IN A CLOSED LOOP COOLED AIRFOIL

(75) Inventors: Yufeng Phillip Yu; Gary Michael Itzel, both of Simpsonville, SC (US); Sarah Jane Osgood, East Thetford, VT (US); Radhakrishna Bagepalli, Schenectady, NY (US); Waylon Willard Webbon, Greenville, SC (US); Steven Sebastian Burdgick, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/571,813

(22) Filed: May 16, 2000

(51) Int. Cl.[7] ................................................. F01D 9/04
(52) U.S. Cl. ....................... 415/115; 415/114; 416/97 R
(58) Field of Search .................................. 415/114, 115, 415/116, 209.2, 209.3; 416/96 R, 97 R, 96 A, 97 A

(56) References Cited

U.S. PATENT DOCUMENTS

| | | | |
|---|---|---|---|
| 5,253,976 A | 10/1993 | Cunha | 415/114 |
| 5,383,766 A | 1/1995 | Przirembel | 416/97 A |
| 5,419,039 A | 5/1995 | Auxier | 416/97 R |
| 5,419,681 A * | 5/1995 | Lee | 416/97 R |
| 5,536,143 A | 7/1996 | Jacala | |
| 5,593,274 A | 1/1997 | Carreno | |
| 5,611,662 A | 3/1997 | Cunha | 415/115 |
| 5,624,231 A * | 4/1997 | Ohtomo et al. | 415/115 |
| 5,634,766 A | 6/1997 | Cunha | 415/115 |
| 5,685,693 A | 11/1997 | Sexton | |
| 5,743,708 A | 4/1998 | Cunha | 415/115 |
| 5,772,398 A * | 6/1998 | Noiret et al. | 416/97 R |
| 5,876,182 A * | 3/1999 | Schulte | 415/115 |
| 5,993,156 A * | 11/1999 | Bailly et al. | 415/115 |

OTHER PUBLICATIONS

"39th GE Turbine State–of–the–Art Technology Seminar", Tab 1, ""F" Technology –the First Half–Million Operating Hours", H.E. Miller, Aug. 1996.

"39th GE Turbine State–of–the–Art Technology Seminar", Tab 2, "GE Heavy–Duty Gas Turbine Performance Characteristics", F. J. Brooks, Aug. 1996.

"39th GE Turbine State–of–the–Art Technology Seminar", Tab 3, "9EC 50Hz 170–MW Class Gas Turbine", A. S. Arrao, Aug. 1996.

"39th GE Turbine State–of–the–Art Technology Seminar", Tab 4, "MWS6001FA –An Advanced–Technology 70–MW Class 50/60 Hz Gas Turbine", Ramachandran et al., Aug. 1996.

(List continued on next page.)

Primary Examiner—F. Daniel Lopez
Assistant Examiner—Richard Woo
(74) Attorney, Agent, or Firm—Nixon & Vanderhye PC

(57) ABSTRACT

Turbine stator vane segments have radially inner and outer walls with vanes extending between them. The inner and outer walls are compartmentalized and have impingement plates. Steam flowing into the outer wall plenum passes through the impingement plate for impingement cooling of the outer wall upper surface. The spent impingement steam flows into cavities of the vane having inserts for impingement cooling of the walls of the vane. The steam passes into the inner wall and through the impingement plate for impingement cooling of the inner wall surface and for return through return cavities having inserts for impingement cooling of the vane surfaces. To provide for air film cooing of select portions of the airfoil outer surface, at least one air pocket is defined on a wall of at least one of the cavities. Each air pocket is substantially closed with respect to the cooling medium in the cavity and cooling air pumped to the air pocket flows through outlet apertures in the wall of the airfoil to cool the same.

21 Claims, 4 Drawing Sheets

OTHER PUBLICATIONS

"39th GE Turbine State–of–the–Art Technology Seminar", Tab 5, "Turbomachinery Technology Advances at Nuovo Pignone", Benvenuti et al., Aug. 1996.
"39th GE Turbine State–of–the–Art Technology Seminar", Tab 6, "GE Aeroderivative Gas Turbines –Design and Operating Features", M. W. Horner, Aug. 1996.
"39th GE Turbine State–of–the–Art Technology Seminar", Tab 7, "Advance Gas Turbine Materials and Coatings", P. W. Schilke, Aug. 1996.
"39th GE Turbine State–of–the–Art Technology Seminar", Tab 8, "Dry Low $NO_x$ Combustion Systems for GE Heavy–Duty Turbines", L. B. Davis, Aug. 1996.
"39th GE Turbine State–of–the–Art Technology Seminar", Tab 9, "GE Gas Turbine Combustion Flexibility", M. A. Davi, Aug. 1996.
"39th GE Turbine State–of–the–Art Technology Seminar", Tab 10, "Gas Fuel Clean–Up System Design Considerations for GE Heavy–Duty Gas Turbines", C. Wilkes, Aug. 1996.
"39th GE Turbine State–of–the–Art Technology Seminar", Tab 11, "Integrated Control Systems for Advanced Combined Cycles", Chu et al., Aug. 1996.
"39th GE Turbine State–of–the–Art Technology Seminar", Tab 12, "Power Systems for the 21st Century "H" Gas Turbine Combined Cycles", Paul et al., Aug. 1996.
"39th GE Turbine State–of–the–Art Technology Seminar", Tab 13, "Clean Coal and Heavy Oil Technologies for Gas Turbines", D. M. Todd, Aug. 1996.
"39th GE Turbine State–of–the–Art Technology Seminar", Tab 14, "Gas Turbine Conversions, Modifications and Uprates Technology", Stuck et al., Aug. 1996.
"39th GE Turbine State–of–the–Art Technology Seminar", Tab 15, "Performance and Reliability Improvements for Heavy–Duty Gas Turbines," J. R. Johnston, Aug. 1996.
"39th GE Turbine State–of–the–Art Technology Seminar", Tab 16, "Gas Turbine Repair Technology", Crimi et al, Aug. 1996.
"39th GE Turbine State–of–the–Art Technology Seminar", Tab 17, "Heavy Duty Turbine Operating & Maintenance Considerations", R. F. Hoeft, Aug. 1996.
"39th GE Turbine State–of–the–Art Technology Seminar", Tab 18, "Gas Turbine Performance Monitoring and Testing", Schmitt et al., Aug. 1996.
"39th GE Turbine State–of–the–Art Technology Seminar", Tab 19, "Monitoring Service Delivery System and Diagnostics", Madej et al., Aug. 1996.
"39th GE Turbine State–of–the–Art Technology Seminar", Tab 20, "Steam Turbines for Large Power Applications", Reinker et al., Aug. 1996.
"39th GE Turbine State–of–the–Art Technology Seminar", Tab 21, "Steam Turbines for Ultrasupercritical Power Plants", Retzlaff et al., Aug. 1996.
"39th GE Turbine State–of–the–Art Technology Seminar", Tab 22, "Steam Turbines Sustained Efficiency", P. Schofield, Aug. 1996.
"39th GE Turbine State–of–the–Art Technology Seminar", Tab 23, "Recent Advances in Steam Turbines for Industrial and Cogeneration Applications", Leger et al., Aug. 1996.
"39th GE Turbine State–of–the–Art Technology Seminar", Tab 24, "Mechanical Drive Steam Turbines", D. R. Leger, Aug. 1996.
"39th GE Turbine State–of–the–Art Technology Seminar", Tab 25, "Steam Turbines for STAG™ Combined–Cycle Power Systems", M. Boss, Aug. 1996.
"39th GE Turbine State–of–the–Art Technology Seminar", Tab 26, "Cogeneration Application Considerations", Fisk et al., Aug. 1996.
"39th GE Turbine State–of–the–Art Technology Seminar", Tab 27, "Performance and Economic Considerations of Repowering Steam Power Plants", Stoll et al., Aug. 1996.
"39th GE Turbine State–of–the–Art Technology Seminar", Tab 28, "High–Power–Density™ Steam Turbine Design Evolution", J. H. Moore, Aug. 1996.
"39th GE Turbine State–of–the–Art Technology Seminar", Tab 29, "Advances in Steam Path Technologies", Cofer, IV, et al., Aug. 1996.
"39th GE Turbine State–of–the–Art Technology Seminar", Tab 30, "Upgradable Opportunities for Steam Turbines", D. R. Dreier, Jr., Aug. 1996.
"39th GE Turbine State–of–the–Art Technology Seminar", Tab 31, "Uprate Options for Industrial Turbines", R. C. Beck, Aug. 1996.
"39th GE Turbine State–of–the–Art Technology Seminar", Tab 32, "Thermal Performance Evaluation and Assessment of Steam Turbine Units", P. Albert, Aug. 1996.
"39th GE Turbine State–of–the–Art Technology Seminar", Tab 33, "Advances in Welding Repair Technology" J. F. Nolan, Aug. 1996.
"39th GE Turbine State–of–the–Art Technology Seminar", Tab 34, "Operation and Maintenance Strategies to Enhance Plant Profitability", MacGillivray et al., Aug. 1996.
"39th GE Turbine State–of–the–Art Technology Seminar", Tab 35, "Generator Insitu Inspections", D. Stanton.
"39th GE Turbine State–of–the–Art Technology Seminar", Tab 36, "Generator Upgrade and Rewind", Halpern et al., Aug. 1996.
"39th GE Turbine State–of–the–Art Technology Seminar", Tab 37, "GE Combined Cycle Product Line and Performance", Chase, et al., Aug. 1996.
"39th GE Turbine State–of–the–Art Technology Seminar", Tab 38, "GE Cycle Experience", Maslak et al., Aug. 1996.
"39th GE Turbine State–of–the–Art Technology Seminar", Tab 39, "Single–Shaft Combined Cycle Power Generation Systems", Tomlinson et al., Aug. 1996.
"Advanced Turbine System Program –Conceptual Design and Product Development", Annual Report, Sep. 1, 1994 –Aug. 31, 1995.
"Advanced Turbine Systems (ATS Program) Conceptual Design and Product Development", Final Technical Progress Report, vol. 2–Industrial Machine, Mar. 31, 1997, Morgantown, WV.
"Advanced Turbine Systems (ATS Program), Conceptual Design and Product Development", Final Technical Progress Report, Aug. 31, 1996, Morgantown, WV.
"Advanced Turbine Systems (ATS) Program, Phase 2, Conceptual Design and Product Development", Yearly Technical Progress Report, Reporting Period: Aug. 25, 1993 –Aug. 31, 1994.
"Advanced Turbine Systems" Annual Program Review, Preprints, Nov. 2–4, 1998, Washington, D.C. U.S. Department of Energy, Office of Industrial Technologies Federal Energy Technology Center.
"ATS Conference"Oct. 28, 1999, Slide Presentation.
"Baglan Bay Launch Site", various articles relating to Baglan Energy Park.
"Baglan Energy Park", Brochure.
"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998. Report Nos. DE–FC21–95MC31176—11.

"Exhibit panels used at 1995 product introduction at PowerGen Europe".

"Extensive Testing Program Validates High Efficiency, reliability of GE's Advanced "H"Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: "First to Reach 60% Combined–Cycle Power Plant Efficiency", Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products"Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined –Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the 21$^{st}$Century –"H"Gas Turbine Combined Cycles", Thomas C. Paul et al., Report,.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D. W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systmes Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, "Rayleigh/Raman/LIF Measurements in a Turbulent Lean Premixed Combustor", Nandula et al. pp. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting, vol. II", "The Role of Reactant Unmixedness, Strain Rate, and Length Scale on Premixed Combustor Performance", Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, "Effects of Geometry on Slot–Jet Film Cooling Performance", Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505. Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, pp. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", "Active Control of Combustion Instabilities in Low $NO_x$ Turbines", Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine –High Efficiency, Low Cost of Electricity and Low Emissions", Roger Schonewald and Patrick Marolda, (no date available),.

"Testing Program Results Validate GE's H Gas Turbine –High Efficiency, Low Cost of Electricity and Low Emissions", Slide Presentation –working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1 –Dec. 31, 1996, Publication Date, Jun. 1, 1997, Report Nos.: DOE/MC/31176—5628.

"Utility Advanced Turbine System (ATS) Technology Readiness Testing — Phase 3", Document #666274, Oct. 1, 1996–Sept. 30, 1997, Publication Date, Dec. 31, 1997, Report Nos.: DOE/MC/31176–10.

"Utility Advanced Turbine System (ATS) Technology Readiness Testing and Pre–Commercial Demonstration, Phase 3", Document #486029, Oct. 1 –Dec. 31, 1995, Publication Date, May 1, 1997, Report Nos.: DOE/MC/31176–5340.

"Utility Advanced Turbine System (ATS) Technology Readiness Testing and Pre–Commercial Demonstration –Phase 3", Document #486132, Apr. 1 –Jun. 30, 1976, Publication Date, Dec. 31, 1996, Report Nos.: DOE/MC/31176–5660.

"Utility Advanced Turbine System (ATS) Technology Readiness Testing and Pre–Commercial Demonstration —Phase 3", Document #587906, Jul. 1 –Sep. 30, 1995, Publication Date, Dec. 31, 1995, Report Nos.: DOE/MC/31176–5339.

"Utility Advanced Turbine System (ATS) Technology Readiness Testing and Pre–Commercial Demonstration"Document #666277, Apr. 1 –Jun. 30, 1997, Publication Date, Dec. 31, 1997, Report Nos.: DOE/MC/31176–8.

"Utility Advanced Turbine System (ATS) Technology Readiness Testing and Pre–Commercialization Demonstration" Jan. 1 –Mar. 31, 1996, DOE/MC/31176—5338.

"Utility Advanced Turbine System (ATS) Technology Readiness Testing: Phase 3R", Document #756552, Apr. 1 –Jun. 30, 1999, Publication Date, Sep. 1, 1999, Report Nos.: DE–FC21–95MC31176–23.

"Utility Advanced Turbine System (ATS) Technology Readiness Testing.", Document #656823, Jan. 1 –Mar. 31, 1998, Publication Date, Aug. 1, 1998, Report Nos.: DOE/MC/31176–17.

"Utility Advanced Turbine Systems (ATS) Technology Readiness Testing and Pre–Commercial Demonstration", Annual Technical Progress Report, Reporting Period: Jul. 1, 1995 —Sep. 30, 1996.

"Utility Advanced Turbine System (ATS) Technology Readiness Testing", Phase 3R, Annual Technical Progress Report, Reporting Period: Oct. 1, 1997 –Sep. 30, 1998.

"Utility Advanced Turbine System (ATS) Technology Readiness Testing", Document #750405, Oct. 1 –Dec. 30, 1998, Publication Date: May, 1, 1999, Report Nos.: DE–FC21–95MC31176–20.

"Utility Advanced Turbine System (ATS) Technology Readiness Testing", Document #1348, Apr. 1 –Jun. 29, 1998, Publication Date Oct. 29, 1998, Report Nos. DE–FC21–95MC31176–18.

"Utility Advanced Turbine System (ATS) Technology Readiness Testing –Phase 3", Annual Technical Progress Report, Reporting Period: Oct. 1, 1996 –Sep. 30, 1997.

"Utility Advanced Turbine System (ATS) Technology Readiness Testing and Pre–Commercial Demonstration", Quarterly Report, Jan. 1 –Mar. 31, 1997, Document #666275, Report Nos.: DOE/MC/31176–07.

"Proceedings of the 1997 Advanced Turbine Systems", Annual Program Review Meeting, Oct. 28–29, 1997.

* cited by examiner

FILM COOLING AIR POCKET IN A CLOSED LOOP COOLED AIRFOIL

This invention was made with Government support under Government contract No. DE-FC21-95-MC31176 awarded by the Department of Energy. The Government has certain rights in this invention.

BACKGROUND OF THE INVENTION

The present invention relates generally to gas turbines, for example, for electrical power generation, and more particularly to cooling the stage one nozzles of such turbines.

The traditional approach for cooling turbine blades and nozzles was to extract high pressure cooling air from a source, for example, from the intermediate and final stages of the turbine compressor. In such a system, a series of internal flow passages are typically used to achieve the desired mass flow objectives for cooling the turbine blades. In contrast, external piping is used to supply air to the nozzles, with air film cooling typically being used and the air exiting into the hot gas stream of the turbine. In advanced gas turbine designs, it has been recognized that the temperature of the hot gas flowing past the turbine components could be higher than the melting temperature of the metal. It was therefore necessary to establish a cooling scheme to protect the hot gas path components during operation. Steam has been demonstrated to be a preferred cooling media for cooling gas turbine nozzles (stator vanes), particularly for combined-cycle plants. See, for example, U.S. Pat. No. 5,253,976, the disclosure of which is incorporated herein by this reference. For a complete description of the steam-cooled buckets, reference is made to U.S. Pat. No. 5,536,143, the disclosure of which is incorporated herein by reference. For a complete description of the steam (or air) cooling circuit for supplying cooling medium to the first and second stage buckets through the rotor, reference is made to U.S. Pat. No. 5,593,274, the disclosure of which is incorporated herein by reference.

Because steam has a higher heat capacity than the combustion gas, however, it is considered inefficient to allow the coolant steam to mix with the hot gas stream. Consequently, in conventional steam cooled buckets it has been considered desirable to maintain cooling steam inside the hot gas path components in a closed circuit. Nevertheless, certain areas of the components in the hot gas path cannot practically be cooled with steam in a closed circuit. For example, the relatively thin structure of the trailing edges of the nozzle vanes effectively precludes steam cooling of those edges. Accordingly, air cooling is used to cool those portions of the nozzle vanes. For a complete description of the steam cooled nozzles with air cooling along the trailing edge, reference is made to U.S. Pat. No. 5,634,766, the disclosure of which is incorporated herein by reference.

BRIEF SUMMARY OF THE INVENTION

In a typical closed loop steam or air cooled nozzle design such as that briefly described above and disclosed in the above-mentioned patents, the steam or air is used to cool the nozzle wall via impingement, or convection in the case of the trailing edge cavity. In some cases, with this kind of cooling scheme, the thermal gradient in the nozzle wall can reach very high levels, which can cause low LCF (Low Cycle Fatigue) life for local regions of the nozzle wall.

The present invention modifies the typical closed loop steam or air cooled nozzle design by introducing cooling media, e.g. air, film cooling to greatly reduce local thermal gradient, which, in turn, will increase the local LCF life. More specifically, the invention is embodied in the addition of at least one air pocket to a closed loop steam or air cooled nozzle for providing a cooling air source for film cooling of the airfoil surface in regions where low LCF life would otherwise exist due to high thermal gradient. The air pocket is located inside one or more cavities of a closed loop steam or air cooled gas turbine nozzle. Air is piped into the air pocket and then flows out into the hot gas path through air film holes that are defined in the airfoil wall to communicate the air pocket to the vane exterior.

Thus, in an embodiment of the present invention, there is provided a cooling system for cooling the hot gas components of a nozzle stage of a gas turbine, in which closed circuit steam or air cooling and/or open circuit air cooling systems may be employed. In the closed circuit system, a plurality of nozzle vane segments are provided, each of which comprises one or more nozzle vanes extending between radially inner and outer walls. The vanes have a plurality of cavities in communication with compartments in the outer and inner walls for flowing cooling media in a closed circuit for cooling the outer and inner walls and the vanes per se. This closed circuit cooling system is substantially structurally similar to the steam cooling system described and illustrated in the prior referenced U.S. Pat. No. 5,634,766, with certain exceptions as noted below. Thus, cooling media may be provided to a plenum in the outer wall of the segment for distribution to chambers therein and passage through impingement openings in a plate for impingement cooling of the outer wall surface of the segment. The spent impingement cooling media flows into leading edge and aft cavities extending radially through the vane. At least one cooling fluid return/intermediate cooling cavity extends radially and lies between the leading edge and aft cavities. A separate trailing edge cavity may also provided. The flow of cooling air in a trailing edge cavity per se is the subject of a U.S. Pat. No. 5,611,662, the disclosure of which is incorporated herein by reference. The cooling air from that trailing edge cavity flows to the inner wall, for flow through a passage for supplying purge air to the wheelspace, or into the hot gas path. To cool the airfoil surface in regions where low LCF life will otherwise exist due to high thermal gradient, at least one air pocket is located inside one or more of the aforementioned cavities of the closed loop steam or air cooled gas turbine nozzle. Air is piped into the air pocket and then flows out into the hot gas path through air film holes defined in the airfoil wall, to communicate the air pocket to the vane exterior and thereby create a cooling air film to cool the airfoil surface.

More specifically, in a preferred embodiment of the present invention, there is provided a closed circuit stator vane segment comprising radially inner and outer walls spaced from one another, a vane extending between the inner and outer walls and having leading and trailing edges, the vane including discrete leading edge, trailing edge and intermediate cavities between the leading and trailing edges and extending radially of the vane, an insert in the leading edge cavity for receiving cooling media and having impingement openings for directing the cooling media against interior wall surfaces of the leading edge cavity for impingement cooling of the vane about the leading edge cavity, an insert in the intermediate cavity for receiving cooling media and having impingement openings for directing the cooling media against interior wall surfaces of the intermediate cavity for impingement cooling of the vane about the intermediate cavity, the trailing edge cavity lying in communication with a cooling air inlet for receiving cooling air therefrom and having an outlet one of at a trailing edge thereof and at a radially inner end thereof, for directing spent cooling air one of into the hot gas path exterior to the vane and into a wheelspace between adjacent turbine stages, and wherein at least one air pocket is defined in a wall of at least one of the cavities. Each air pocket is substantially closed with respect to the respective cavity, is in flow communication with a source of cooling air, and has at least one outlet aperture for flow communication between an interior of the pocket and the exterior of the vane, to cool the airfoil surface.

The present invention may further be embodied in a closed circuit cooling system for cooling the hot gas components of nozzle stages of a gas turbine, particularly the first nozzle stage, in combination with an open circuit air cooling system for certain of those components. More particularly, nozzle vane segments are provided having the necessary structural integrity under high thermal fluxes and pressures affording a capacity of being cooled by a cooling medium, preferably steam, flowing in a pressurized closed circuit and in combination with open air circuit cooling. Thus, the present invention provides, in at least the first stage of a turbine, a plurality of nozzle vane segments each of which comprise one or more nozzle vanes extending between radially outer and inner walls. The vanes have a plurality of cavities in communication with compartments in the outer and inner walls for flowing a cooling media, preferably steam, in a closed-circuit path for cooling the outer and inner walls and the vanes, per se. Impingement cooling is provided in the leading cavity of the vane, as well as in the intermediate, return cavity(ies) of the first stage nozzle vane. Inserts in the leading and aft cavities comprise sleeves that extend through the cavities, spaced from the walls thereof. The inserts have impingement holes in opposition to the walls of the cavity it whereby steam flowing into the inserts flows outwardly through the impingement holes for impingement cooling of the vane walls. Return channels are provided along the inserts for channeling the spent impingement cooling steam. Similarly, inserts in the return, intermediate cavity(ies) have impingement openings for flowing impingement cooling medium against the side walls of the vane. Those inserts also have return cavities for collecting the spent impingement cooling steam and transmitting it to the steam outlet.

The open circuit air cooling system is provided for air film cooling of the airfoil surface in regions where low LCF life will otherwise exist due to high thermal gradient. More particularly, at least one air pocket is defined in or along at least a portion of the wall of at least one cavity of the segment and a plurality of rearwardly directed openings are defined through the wall for communicating the air pocket with the segment exterior. Cooling air exiting these openings film cools the exterior surface of the vane along the leading edge and/or intermediate cavity(ies). A conventional open air cooling system may also be provided for cooling the trailing edge cavity.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
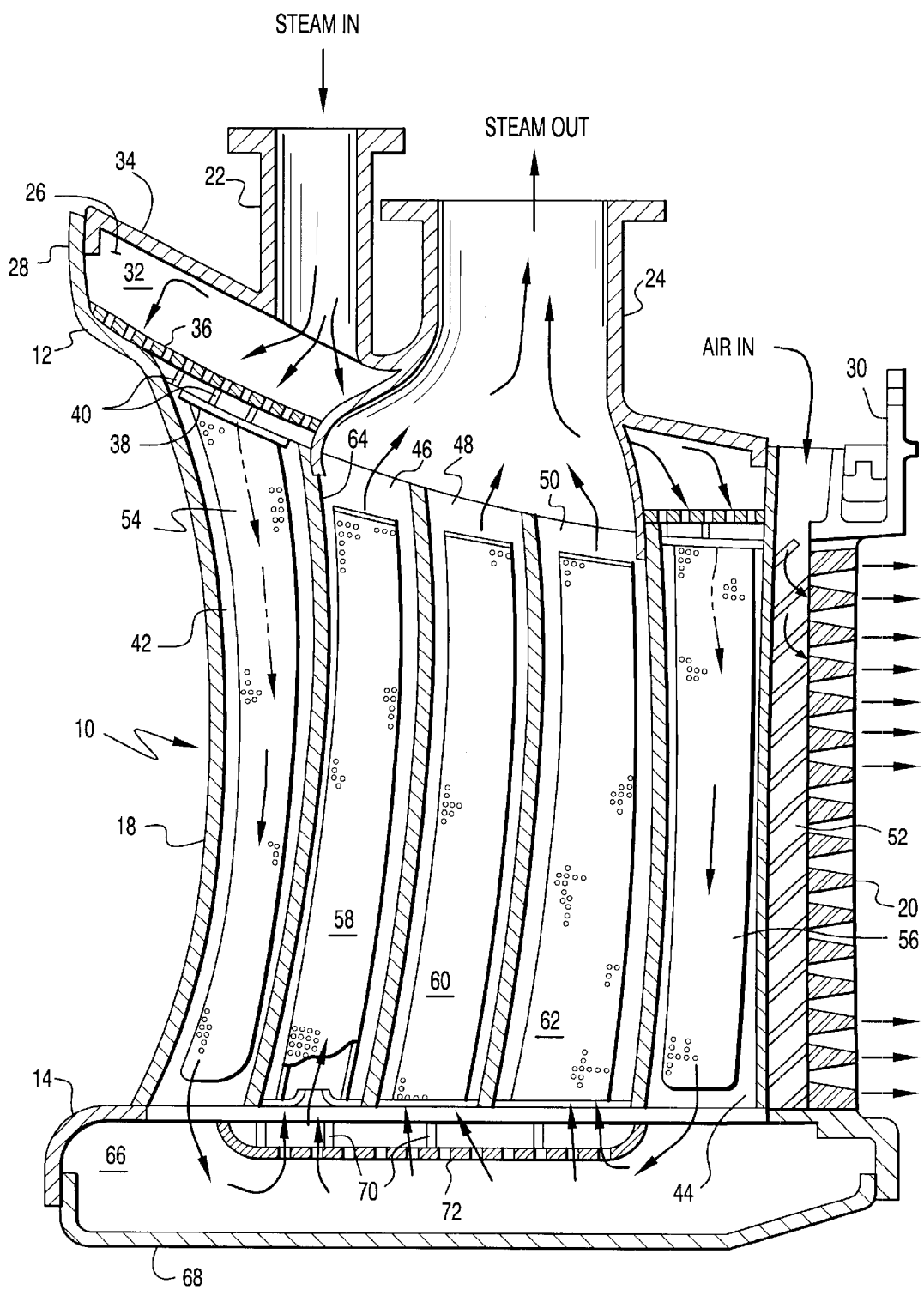
FIG. 1 is an schematic cross-sectional view of a first stage nozzle vane.

As discussed previously, the present invention relates in particular to cooling circuits for the first stage nozzles of a turbine, reference being made to the previously identified patents for disclosures of various other aspects of the turbine, its construction and methods of operation. Referring now to FIG. 1, there is schematically illustrated in cross-section a vane 10 comprising one of the plurality of circumferentially arranged segments of the first stage nozzle. It will be appreciated that the segments are connected one to the other to form an annular array of segments defining the hot gas path through the first stage nozzle of the turbine. Each segment includes radially spaced outer and inner walls 12 and 14, respectively, with one or more of the nozzle vanes 10 extending between the outer and inner walls. The segments are supported about the inner shell of the turbine (not shown) with adjoining segments being sealed one to the other. It will therefore be appreciated that the outer and inner walls and the vanes extending therebetween are wholly supported by the inner shell of the turbine and are removable with the inner shell halves of the turbine upon removal of the outer shell 16 as set forth in U.S. Pat. No. 5,685,693. For purposes of this description, the vane 10 will be described as forming the sole vane of a segment, the vane having a leading edge 18 and a trailing edge 20. With the segments fixed to the inner shell (not shown), the first and second stage nozzles, i.e., the non-rotating components of the first and second stages, may be removed from the turbine upon removal of the inner shell, as set forth in the above-identified patent, for repair and maintenance and it will also be appreciated that the first and second stage nozzles, having combined closed circuit steam cooling and air cooling may serve as replacement nozzle stages for wholly air cooled nozzle stages whereby the turbine is converted from the solely air cooled turbine to a combined steam and air cooled turbine.

The first stage nozzle vane segment has a cooling steam inlet 22 to the outer wall 12. A return steam outlet 24 also lies in communication with the nozzle segment. The outer wall 12 includes outer side railings 26, a leading railing 28, and a trailing railing 30 defining a plenum 32 with the upper surface 34 and an impingement plate 36 disposed in the outer wall 12. (The terms outwardly and inwardly or outer and inner refer to a generally radial direction). Disposed between the impingement plate 36 and the inner wall 38 of outer wall 12 are a plurality of structural ribs 40 extending between the side walls 26, forward wall 28 and trailing wall 30. The impingement plate 36 overlies the ribs 40 throughout the full extent of the plenum 32. Consequently, steam entering through inlet 22 into plenum 32 passes through the openings in the impingement plate 36 for impingement cooling of the inner surface 38 of the outer wall 12.

In this exemplary embodiment, the first stage nozzle vane 10 has a plurality of cavities, for example, the leading edge cavity 42, an aft cavity 44, three intermediate return cavities 46, 48 and 50, and also a trailing edge cavity 52.

Leading edge cavity 42 and aft cavity 44 each have an insert, 54 and 56 respectively, while each of the intermediate cavities 46, 48 and 50 have similar inserts 58, 60 and 62, respectively, all such inserts being in the general form of hollow, perforated sleeves. The inserts may be shaped to correspond to the shape of the particular cavity in which the insert is to be provided. The side walls of the sleeves are provided with a plurality of impingement cooling openings, along portions of the insert which lie in opposition to the walls of the cavity to be impingement cooled. For example, in the leading edge cavity 42, the forward edge of the insert 54 would be arcuate and the side walls would generally correspond in shape to the side walls of the cavity 42, all such walls of the insert having impingement openings. The back side of the sleeve or insert 54 in opposition to the rib 64 separating cavity 42 from cavity 46, however, would not have impingement openings. In the aft cavity 44, on the other hand, the side walls, only, of the insert sleeve 56 would have impingement openings; the forward and aft walls of insert sleeve 56 being of a solid non-perforated material.

It will be appreciated that the inserts received in cavities 42, 44, 46, 48, and 50 are spaced from the walls of the cavities to enable cooling media, e.g., steam, to flow through the impingement openings to impact against the interior wall surfaces of the cavities, thus cooling the wall surfaces.

As illustrated in FIG. 1, the post-impingement cooling steam flows into a plenum 66 defined by the inner wall 14 and a lower cover plate 68. Structural strengthening ribs 70 are integrally cast with the inner wall 14. Radially inwardly of the ribs 70 is an impingement plate 72. As a consequence, it will be appreciated that the spent impingement cooling steam flowing from cavities 42 and 44 flows into the plenum 66 for flow through the impingement openings of impingement plate 72 for impingement cooling of the inner wall 14. The spent cooling steam flows by direction of the ribs 70 towards the openings (not shown in detail) for return flow through the cavities 46, 48, and 50 to the steam outlet 24. Inserts 58, 60 and 62 are disposed in the cavities 46, 48, and 50 in spaced relation from the side walls and ribs defining the respective cavities. The impingement openings lie on opposite sides of the sleeves for flowing the cooling media, e.g., steam, from within the inserts through the impingement openings for impingement cooling of the side walls of the vane. The spent cooling steam then flows out the port 24 for return to, e.g., the steam supply.

The air cooling circuit of the trailing edge cavity of the combined steam and air cooling circuits of the vane illustrated in FIG. 1 generally corresponds to that of the '766 patent and, therefore, a detailed discussion herein is omitted.

Figure 2:
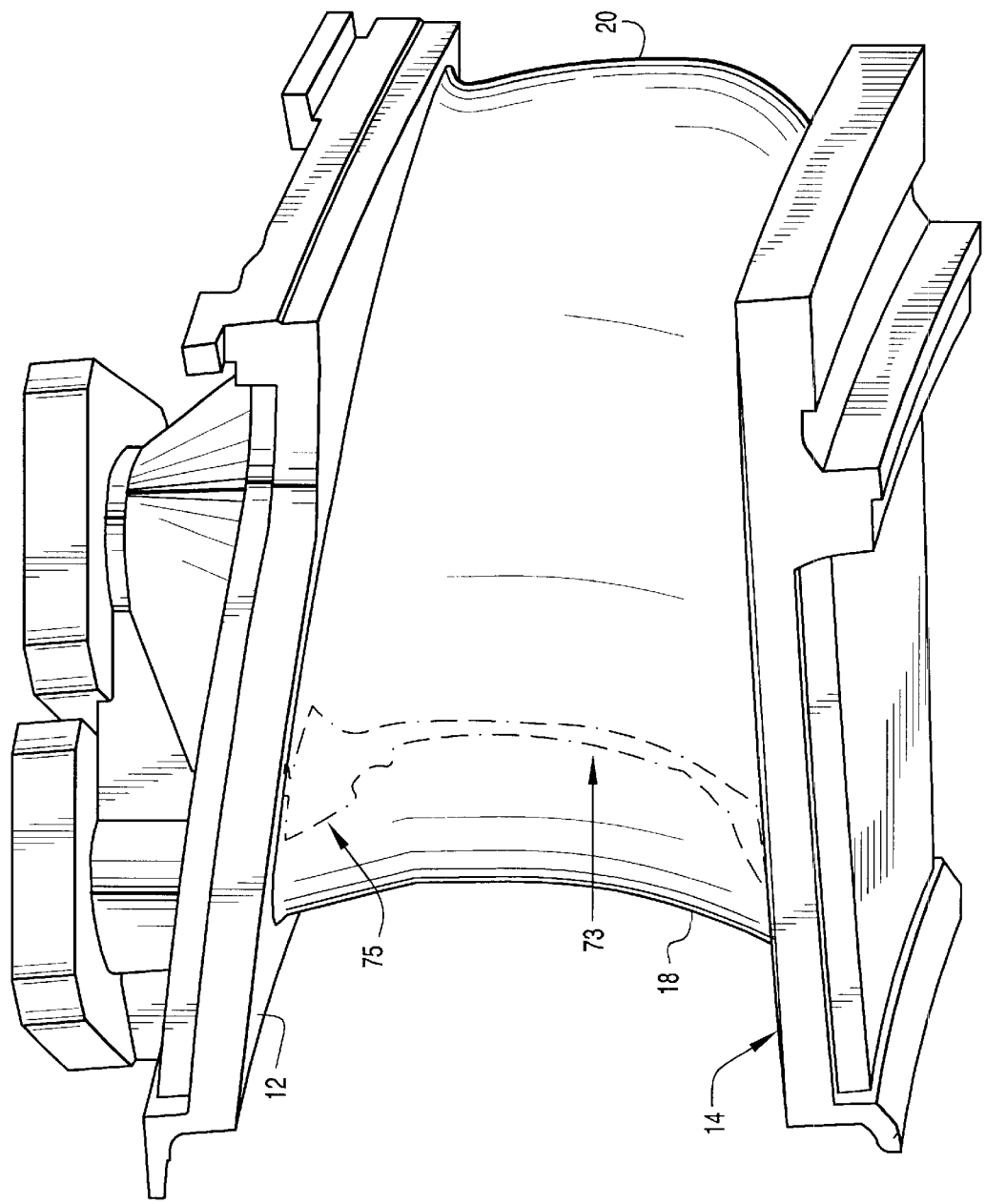
FIG. 2 is a perspective view of a typical first stage nozzle, showing life limiting regions.

As noted above, in a typical closed loop steam or air cooled nozzle design, the steam or air is used to cool the nozzle wall via impingement, or convection in the case of the trailing edge cavity. However, with this kind of cooling scheme, the thermal gradient in the nozzle wall can reach very high levels, which can cause low LCF (Low Cycle Fatigue) life for local regions of the nozzle wall. FIG. 2 schematically illustrates, generally at 73, an exemplary such low LCF region of the nozzle wall. One portion of the low LCF region, identified as 75, is of particular interest as this portion of the vane can exhibit a particularly low LCF life. Region 75, would be a particularly desirable area in which to reduce the thermal gradient to improve LCF life. However, in some applications it may be desirable to reduce the temperature gradient along a greater part or the entire length of the identified life limiting region 73, or other areas of the nozzle that are generally the same configuration.

To increase the local LCF life, the present invention proposes to modify the typical closed loop steam or air cooled nozzle design by introducing a cooling media, e.g. air, for film cooling to greatly reduce local thermal gradient. This in turn increases the local LCF life. More specifically, the invention is embodied in the addition of at least one air pocket 174 to a closed loop steam or air cooled nozzle for providing a cooling air source for film cooling of the airfoil surface in regions where low LCF life will otherwise exist due to high thermal gradient. Air is piped into the air pocket 174 and then flows out into the hot gas path 176 through air film holes 178, also referred to herein as outlet apertures or outlet holes, defined in the airfoil wall 180 to communicate the air pocket to the vane exterior. The inner wall 182 of the air pocket is completely imperforate, as in the illustrated embodiment, or at least substantially imperforate, so that the air pocket is at least substantially closed with respect to the interior of the respective cavity.

Figure 3:
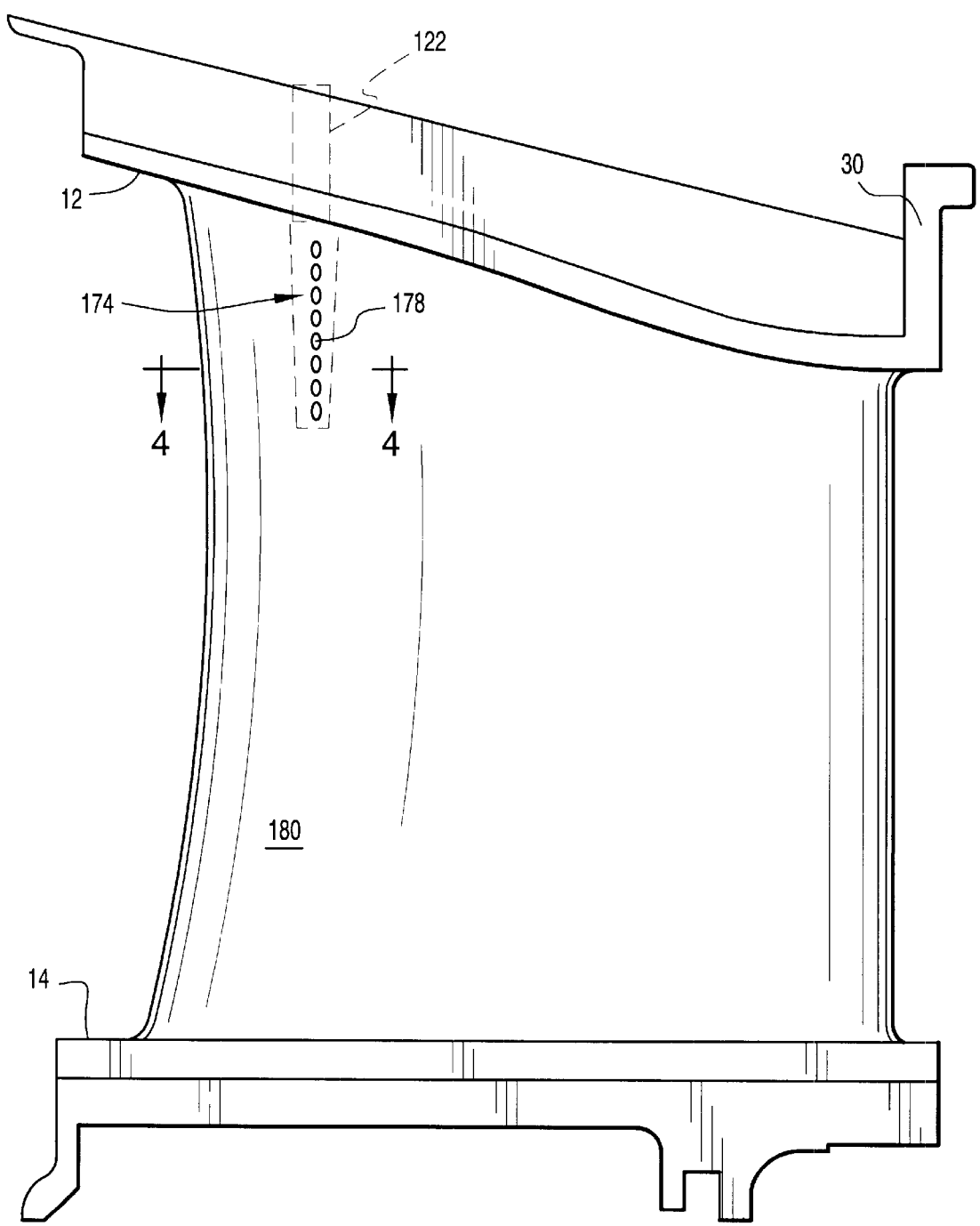
FIG. 3 is an elevational view of a vane of the type shown in FIG. 1 having an air pocket as an embodiment of the invention.

Referring to FIG. 3, the disposition of an air pocket embodying the invention is schematically shown. In the illustrated embodiment, the air pocket 174 extends radially along approximately one half the radial length of the airfoil 10, from the radially outer wall 12, where it receives air via air pipes schematically shown at 122. The air supply to the air pocket may be derived from any suitable source and may be common to the source of air for the trailing edge cavity. Although the illustrated air pocket 174 extends along only a part of the radial length of the airfoil 10, it is to be understood that such a pocket may be part length or extend along the entire length of its respective vane cavity. Moreover, while the pocket 174 is defined in the illustrated embodiment to extend from and have air inlet pipe 122 or other air source defined at the outer wall 12, the air source may be defined at the radially inner end of the vane, and the air pocket can extend therefrom accordingly.

The disposition of an film cooling holes 178 in an embodiment of the invention is also shown in FIG. 3. In the illustrated embodiment, the film cooling holes are defined in a substantially linear array extending radially along the length of the air pocket. However, it is to be understood that the film cooling hole array need not be linear and the holes could be limited to select portions of the air pocket as deemed necessary or desirable to effect the cooling to improve LCF life. Moreover, while the film cooling holes are uniformly spaced in the illustrated embodiment, the hole density can vary to effect a desired cooling intensity and/or pressure looses along the length of the pocket.

The pocket 174 is preferably defined so that the film cooling holes communicating therewith are disposed upstream of the local low LCF region. Thus, with reference to FIGS. 2 and 3, in the presently preferred, illustrated embodiment, an air pocket is located inside the leading edge cavity of the airfoil. If deemed necessary or desirable, an additional air pocket or pockets may be defined to extend along the leading edge cavity and/or, in addition or in the alternative, one or more air pockets may be defined in other(s) of the cavities of the airfoil, depending upon the potential low LCF regions and the inevitable cost benefit analysis of the manufacturing complexity and efficiency considerations balanced with the resultant increase in LCF life.

Figure 4:
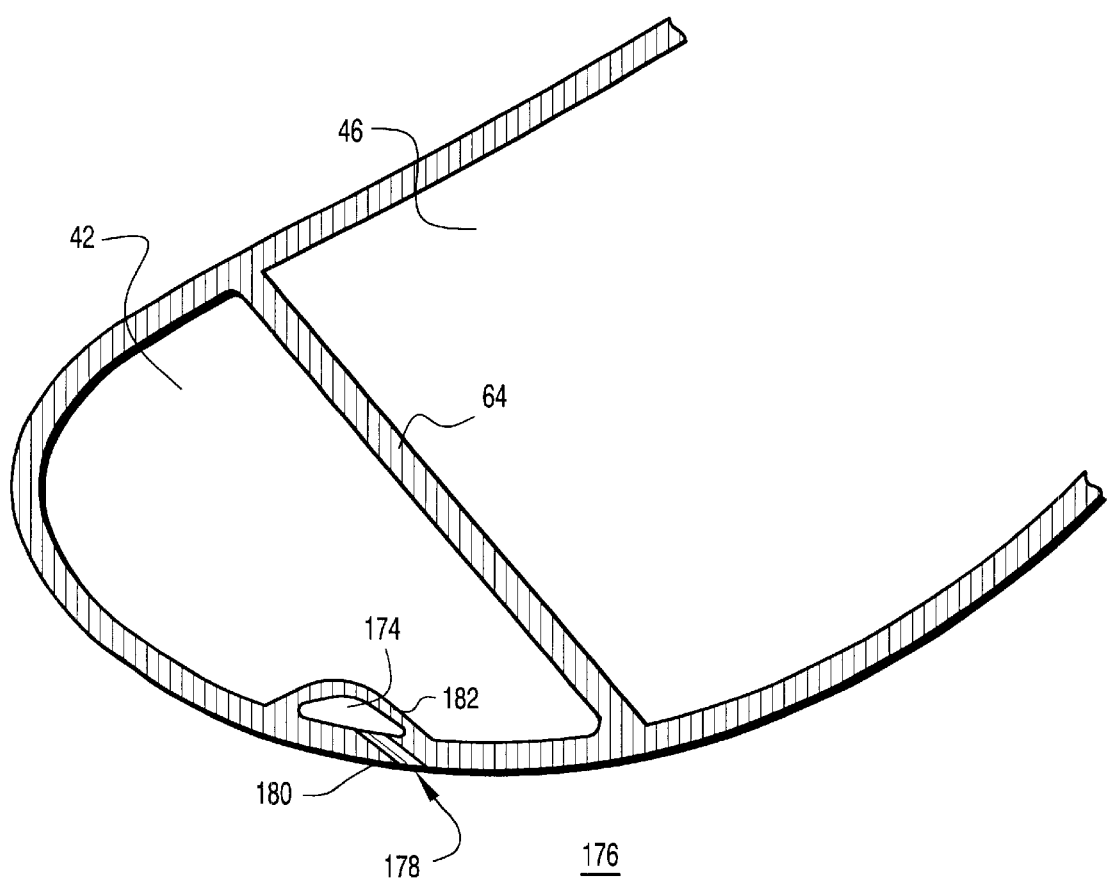
FIG. 4 is a schematic cross-sectional view taken along line 4—4 of FIG. 3.

As shown in FIG. 4, the film holes 178 are preferably directed rearwardly, i.e., inclined to the plane of the wall 180 of the airfoil 10 so as produce a flow on or along that side wall as a cooling film, so as to cool the local low LCF regions disposed in the vicinity and downstream thereof, to reduce the thermal gradient in that region.

Thus, it will be appreciated that the invention is preferably embodied in the addition of an open cooling air circuit vis a vis the air pocket, to a closed cooling circuit or a cooling circuit that has a closed coolant flow path, e.g., for steam cooling the vane cavities and an open coolant flow path, e.g., for air cooling the trailing edge cavity.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A stator vane segment for forming part of a stage of a turbine, comprising:

inner and outer walls spaced from one another;

a stator vane extending between said inner and outer walls and having leading and trailing edges, said vane including a plurality of discrete cavities between the leading and trailing edges and extending lengthwise of said vane for flowing a cooling medium;

at least one air pocket defined one of in and along a wall of at least one said cavity, each air pocket being substantially closed with respect to the respective cavity and being in flow communication with a source of cooling air; and at least one outlet aperture for flow communication between an interior of each pocket and an exterior surface of the vane, wherein said plurality of discrete cavities includes a leading cavity, at least one intermediate cavity, and an aft cavity together defining a substantially closed cooling medium flow passage through the vane, and wherein said at least one air pocket is defined along a wall of at least one of said leading and intermediate cavities.

2. A stator vane segment according to claim 1 wherein an insert sleeve is disposed within said at least one cavity and spaced from the inner wall of said vane to define a gap therebetween, said insert having an inlet for flowing the cooling medium into said insert sleeve, said insert sleeve having a plurality of openings therethrough for flowing the cooling medium through said sleeve into said gap for impingement against an inner wall surface of said vane.

3. A vane segment as in claim 1, wherein said at least one outlet aperture is defined at an angle to the wall of the vane so that cooling air flowing therethrough is directed to the exterior of the vane in a downstream direction.

4. A vane segment as in claim 1, wherein there are a plurality of outlet apertures defined through said wall.

5. A vane segment as in claim 4, wherein said plurality of outlet apertures are defined in a substantially linear array.

6. A vane segment as in claim 5, wherein said air pocket extends from adjacent said outer wall of said vane.

7. A turbine vane segment, comprising:

inner and outer walls spaced from one another;

a vane extending between said inner and outer walls and having leading and trailing edges, said vane including a plurality of discrete cavities between the leading and trailing edges and extending lengthwise of said vane for flowing a cooling medium therethrough, said plurality of discrete cavities including a leading cavity, at least one intermediate cavity, and an aft cavity together defining a substantially closed cooling medium flow passage through the vane;

said outer wall defining at least one cooling media plenum;

a cooling medium inlet enabling passage of the cooling medium into said cooling media plenum;

said vane having a first opening communicating said cooling media plenum of said outer wall with at least one of said cavities to enable passage of the cooling medium between said one plenum and said one cavity, at least one air pocket defined to extend along at least a portion of a length of at least one of said leading and intermediate cavities, each air pocket being substantially closed with respect to an interior of the respective cavity and being in flow communication with a source of cooling air, at least one outlet aperture for flow communication between an interior of said pocket and an exterior surface of the vane; and an insert sleeve within said one cavity and spaced from interior wall surfaces thereof, said insert sleeve having an inlet for flowing the cooling medium into said insert sleeve, said insert sleeve having a plurality of openings therethrough for flowing the cooling medium through said sleeve openings into said space between said sleeve and said interior wall surfaces for impingement against said interior wall surface of said vane to cool the same.

8. A turbine vane segment according to claim 7, wherein said inner wall has at least one rib along an inner surface thereof defining inner compartments inwardly of said inner surface; and further comprising:

a cover for said inner compartments spaced from said inner surface, an impingement plate between said cover and said inner surface, said vane having a second opening in communication with said plenum of said inner wall to enable passage of the cooling medium, said impingement plate having openings enabling passage of the cooling medium for impingement cooling of said inner wall.

9. A turbine vane segment according to claim 7, wherein one of said cavities comprises a trailing edge cavity having a plurality of openings through the trailing edge of said vane for flowing a cooling medium from said trailing edge cavity through said openings to an exterior of said vane.

10. A turbine vane segment as in claim 7, wherein said at least one outlet aperture is defined at an angle to the wall of the vane so that cooling air flowing therethrough is directed to the exterior of the vane in a downstream direction.

11. A turbine vane segment as in claim 7, wherein there are a plurality of outlet apertures defined through said wall.

12. A turbine vane segment as in claim 11, wherein said plurality of outlet apertures are defined in a substantially linear array.

13. A turbine vane segment as in claim 12, wherein said air pocket extends from adjacent said outer wall of said vane.

14. A stator vane segment, comprising:

inner and outer walls spaced from one another;

a vane extending between said inner and outer walls and having leading and trailing edges, said vane including a plurality of discrete cavities between the leading and trailing edges and extending lengthwise of said vane, said plurality of discrete cavities including a leading cavity, at least one intermediate cavity, and an aft cavity together defining a substantially closed cooling medium flow passage through the vane;

said inner and outer walls defining respective plenums and an impingement plate in each said plenum, an inlet into said outer wall for flowing steam into the outer wall plenum and through the impingement plate in said outer wall plenum for impingement steam cooling an upper surface of said outer wall;

an insert in one of said cavities for receiving spent impingement steam from said outer wall and having impingement openings for directing the steam received from said outer wall against interior wall surfaces of said one cavity for impingement cooling of the vane about said one cavity;

said inner wall having an opening for receiving the spent impingement steam from said one cavity into the inner wall plenum for flow through the impingement plate therein and impingement cooling of the inner wall;

an insert in another of said cavities for receiving spent impingement steam from said inner wall and having impingement openings for directing the steam received from said inner wall against interior wall surfaces of said another cavity for impingement cooling of the vane about said another cavity;

an outlet for receiving the spent impingement steam from said another cavity, whereby the steam flow through said inner and outer walls, said one cavity and said another cavity constitutes a closed flow circuit through said vane; and at least one air pocket defined to extend along at least a portion of a length of at least one of said leading and intermediate cavities, each air pocket being substantially closed with respect to an interior of the respective cavity and being in flow communication with a source of cooling air, and having at least one outlet aperture for flow communication between an interior of said pocket and an exterior of the vane.

15. A stator vane segment as in claim 14, wherein said air pocket extends from adjacent said outer wall of said vane and there are a plurality of said outlet apertures, disposed in a substantially linear array.

16. A turbine vane segment, comprising:

inner and outer walls spaced from one another;

a vane extending between said inner and outer walls and having leading and trailing edges, said vane including a plurality of discrete cavities between the leading and trailing edges and extending lengthwise of said vane for flowing a cooling medium;

an insert sleeve disposed within one said cavity and being spaced from an inner wall surface of said vane, an inlet to said insert sleeve for flowing the cooling medium into said insert sleeve, said insert sleeve having a plurality of openings therethrough for flowing the cooling medium through said sleeve for impingement against an inner wall surface of said vane; and an air pocket defined to extend along at least a portion of a radial length of at least one of said cavities, said air pocket being substantially sealed with respect to cooling medium in said at least one cavity, said air pocket having a cooling air inlet at a radially outer end thereof operatively coupled to a source of cooling air and a plurality of cooling air outlet holes defined through a wall of said vane so as to define a communication passage between an interior of said air pocket and an exterior of said vane whereby cooling air flowing into said air pocket through said inlet flows through said outlet holes to an exterior of said vane for flowing along at least a portion of an exterior surface of said vane downstream from said outlet holes to define a cooling air film for cooling an exterior surface of said vane downstream thereof thereby to increase an LCF life of at least a region downstream thereof.

17. A turbine vane segment as in claim 16, wherein said one cavity and a cavity aft therefrom together define a closed cooling circuit for flowing cooling media from a cooling media inlet, radially inwardly through said vane to said inner wall, and then radially outwardly through said vane to a cooling media outlet at said outer wall, and wherein said air pocket extends along at least one of said cavities defining said closed cooling circuit.

18. A turbine vane segment as in claim 16, wherein at least some of said outlet holes are defined at an angle to the wall of the vane so that cooling air flowing therethrough is directed to the exterior of the vane in a downstream direction.

19. A vane segment as in claim 16, wherein said plurality of outlet holes are defined in a substantially linear array that extends along at least a part of a length of the vane.

20. A vane segment as in claim 16, wherein said air pocket extends from adjacent said outer wall of said vane.

21. A vane segment as in claim 16, wherein said plurality of discrete cavities includes a leading cavity, at least one intermediate cavity, and an aft cavity together defining a substantially closed cooling medium flow passage through the vane, and wherein said at least one air pocket is defined along a wall of at least one of said leading and intermediate cavities.

* * * * *